March 23, 1948.   M. A. MOSESMAN   2,438,449
SYNTHESIS OF HYDROCARBONS AND OXYGENATED COMPOUNDS
Filed Dec. 20, 1946
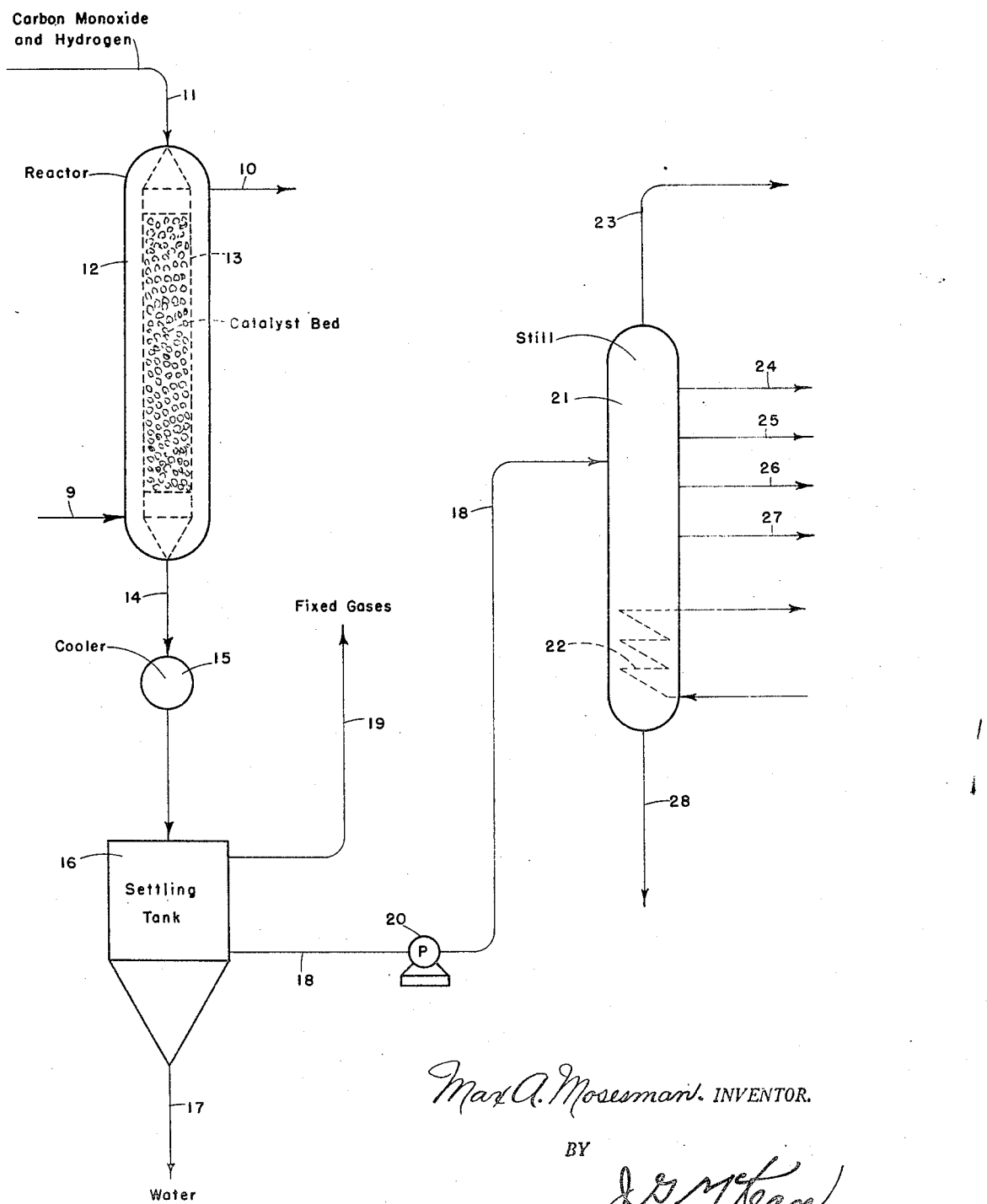
Max A. Mosesman, INVENTOR.
BY
J. D. McLean
ATTORNEY Patented Mar. 23, 1948

2,438,449

UNITED STATES PATENT OFFICE 2,438,449

SYNTHESIS OF HYDROCARBONS AND OXYGENATED COMPOUNDS

Max A. Mosesman, Baytown, Tex., assignor, by mesne assignments, to Standard Oil Development Company, Elizabeth, N. J., a corporation of Delaware Application December 20, 1946, Serial No. 717,586

11 Claims. (Cl. 260—449.6)

1

The present invention is directed to an improved method for effecting the synthesis of hydrocarbons and oxygenated organic compounds from carbon monoxide and hydrogen.

It is well known to the art to produce hydrocarbons by the reaction of carbon monoxide and hydrogen in the presence of a catalyst and under well defined conditions of temperature, pressure, and contact time, these conditions being adjusted for the particular type of catalyst being employed. The products obtained by the reaction of carbon monoxide and hydrogen also vary in type, configuration, and molecular weight depending upon the type of catalyst employed. Paraffinic and olefinic hydrocarbons are the usual products obtained in a reaction of this type; by-products consist chiefly of water, oxygenated compounds and carbon monoxide. Experience has shown that the oxygenated compounds are predominantly alcoholic in nature and that small amounts of esters, organic acids, ketones and aldehydes are usually also formed.

Workers in the prior art have disclosed processes for hydrogenating carbon monoxide to produce hydrocarbons using catalysts such as sintered iron promoted with an alkali metal compound and reduced in a hydrogen atmosphere, or by the reduction or oxidation of iron or of metals of the iron group in mixtures of hydrogen and steam. The crystal structure of the several iron oxides is well known from the results of X-ray diffraction examination. The prior art workers have also employed as catalyst for the Fischer synthesis process reduced $Fe_3O_4$ or reduced alpha ferric oxide; these catalysts were prepared by reducing promoted $Fe_3O_4$ crystals directly or by reducing alpha $Fe_2O_3$ crystals.

In accordance with the present invention, carbon monoxide and hydrogen are brought into contact with an iron oxide type catalyst under suitable temperatures and pressures to produce high yields of hydrocarbons as well as oxygenated organic compounds. The iron oxide catalyst employed in the present invention is prepared by admixing iron oxide with an alkali metal pyroantimoniate such as sodium, potassium, or lithium pyroantimoniate and then heating the mixture of iron oxide and alkali metal pyroantimoniate in an oxidizing atmosphere and then in a reducing atmosphere at an elevated temperature prior to employment in the synthesis of hydrocarbons from carbon monoxide and hydrogen.

Accordingly, the present invention may be described briefly as involving the contacting of a

2 mixture of hydrogen and carbon monoxide with a catalyst which is obtained by subjecting to a reducing atmosphere at superatmospheric temperatures iron oxide either in the form of alpha, gamma, or ferro-ferric oxide in admixture with an alkali metal pyroantimoniate with the feed gases being maintained under temperature and pressure conditions sufficient to cause the formation of substantial amounts of hydrocarbons and oxygenated organic compounds.

It is preferred to contact the mixture of hydrogen and carbon monoxide with the catalyst at a temperature in the range of 450° to 675° F. and at a pressure within the range of 100 to 500 pounds per square inch gauge. It is also desirable for the hydrogen and carbon monoxide to be present in ratios within the range of 2:1 to 1:1 and to use feed rates within the range of 100 to 1500 volumes of feed per volume of catalyst per hour.

The alkali metal pyroantimoniate employed as a catalyst in the present invention is preferably potassium pyroantimoniate; however, as mentioned before, the sodium or lithium pyroantimoniates may suitably be employed under some conditions. In preparing the catalyst employed in producing hydrocarbons from carbon monoxide and hydrogen, it is preferred to use the alkali metal pyroantimoniate in admixture with the iron oxide in an amount between 0.2 to 20% of the catalyst mass and the iron oxide component in the amount between 80 and 99.8% of the catalyst mass.

The catalyst mass employed in the present invention may be formed in any convenient manner and used in the synthesis of hydrocarbons and oxygenated compounds from the afore-mentioned feed mixture. As one method of producing the catalyst mass, iron oxide in the form of ferro-ferric oxide may be admixed with substantially pure potassium pyroantimoniate ($K_4Sb_2O_7$) and the admixture has added to it sufficient alcohol to permit mixing and to slurry it to a thick, smooth paste. The paste is then dried at about 107° C. to form a solid cake-like mass which is ground to pass a 30 mesh screen, redried, and formed into pills. The pilled material is then heated in a free oxygen-containing atmosphere at 1000° F. for about 4½ hours and allowed to cool to obtain the finished catalyst.

Preferably, before the catalyst prepared in the foregoing manner is suitable for employment in the synthesis of hydrocarbons and oxygenated organic compounds from carbon monoxide and hydrogen, it should be reduced by treatment with a reducing gas, such as hydrogen or carbon monoxide, at a temperature of approximately 500° to approximately 900° F. When hydrogen is the reducing gas, a temperature of about 700° F. and a hydrogen gas rate of about 1000 volumes per volume of catalyst per hour should be employed. When carbon monoxide is the reducing gas, a lower temperature of the order of 500° F. should be used.

The practice of the present invention may now be described by reference to the drawing which is a single figure in the form of a flow diagram showing a mode of practicing one embodiment thereof.

Turning now specifically to the drawing, a mixture of carbon monoxide and hydrogen at the pressure desired for the synthesis reaction is passed through an inlet line represented by the numeral 11 into reactor 12. Within reactor 12 is arranged a catalyst mass 13 which has been prepared by the oxidation and reduction of a mixture of iron oxide and an alkali metal pyroantimoniate. Since the reaction of carbon monoxide and hydrogen is exothermic, tremendous amounts of heat are evolved during the reaction and must be removed from the catalyst bed 13. In order to maintain the temperature of the catalyst bed within the limits required for optimum conversion, a space is provided between reactor bed 13 and vessel 12 and a suitable fluid is passed into the space by inlet line 9 and withdrawn through outlet 10 for controlling the temperature of the catalyst bed.

The effluent from the catalyst bed 13 containing unreacted carbon monoxide and hydrogen, hydrocarbons and oxygenated compounds such as alcohols, carbon dioxide and water is removed through line 14 and passes through a cooling means 15 wherein the major portion of hydrocarbons and water are liquefied. The mixture is withdrawn from cooling means 15 and discharged into a settling means 16 where the total mixture is separated into a hydrocarbon phase and a water phase. Water is withdrawn continuously from settler 16 through line 17 and the hydrocarbon layer is withdrawn continuously through line 18. Non-condensible materials contained in the effluent may be withdrawn from the top of settling means 16 through line 19; these exit gases may be conducted to a separation means, not shown, in order to recover unreacted carbon monoxide and hydrocarbon for recycling to the reactor 12 or may be recycled to the reactor as such.

The liquid hydrocarbon layer is passed through line 18 containing pump 20 and discharged into a distilling means 21, heat being supplied by heating coils 22 to heat the hydrocarbons therein. Hydrocarbon fractions suitable for use as motor fuels, Diesel fuel or components of lubricating oils may be withdrawn from distilling means 21 through lines 23, 24, 25, 26, and 27. A heavy bottoms fraction is withdrawn through line 28 and may be employed as a lubricating oil or as a fuel oil.

It will be recognized by those skilled in the art that the hydrocarbons withdrawn from distillation unit 21 may be employed for many purposes. For example, light olefins, boiling in the range of $C_4$ and $C_5$ hydrocarbons may be alkylated with an isoparaffin, such as isobutane, in the presence of a suitable catalyst to produce a high octane motor fuel. The olefins are also especially valuable since they may form the feed stock for polymerization to polymers having molecular weight and viscosity characteristics suitable for use as lubricating oils. Also, the liquid fractions obtained in the synthesis process may be hydrogenated to improve the stability and octane characteristics thereof. It is to be pointed out that it may be desirable to recover oxygenated organic compounds from both the water and hydrocarbon phases removed from settler 16; the more water-soluble oxygenated hydrocarbons will be present in the water phase whereas the high molecular weight oxygenated compounds which are relatively insoluble in water will be present in the hydrocarbon phase.

While the above discussion has described a method for carrying out the synthesis reaction in the presence of catalysts employing a fixed bed operation, it is to be pointed out that other methods for carrying out the aforesaid synthesis reaction may at times be desirable. For example, the catalyst may be employed in the form of a suspension in a gaseous stream and passed through the reaction zone. The technique for carrying out reactions in a suspension of catalyst, commonly designated as a fluidized catalyst, is well known, and, accordingly, the details of such an operation will not here be given. The catalyst employed in the process of our invention lends itself well to use either in the form of pellets or pills for the fixed bed type of operation or to use as a finely divided powder suspended in a gaseous stream in the fluid catalytic synthesis operation.

The invention will be further illustrated by the following examples:

*Example I*

In this example, a method is described for preparing a catalyst mass suitable for employment in the synthesis of hydrocarbons in accordance with the present invention.

In describing the method for preparing the catalyst mass, reference is made to employment of potassium pyroantimoniate. It is to be understood that the description is given for illustrative purpose only. In preparing the potassium pyroantimoniate, 100 parts of potassium hydroxide were heated in a suitable container until the mass was fused. To the fused molten mass was added gradually 12.6 parts of $Sb_2O_5$, following which the mixture was heated for approximately 15 minutes and allowed to cool. The cooled reaction mixture had added to it approximately 200 parts of distilled water and was then thoroughly agitated and then filtered. The filtrate was set aside while the residue had added to it 100 parts of molten potassium hydroxide. Additional amounts of potassium hydroxide to the extent of 20 parts were then added and the total mixture heated for about 15 minutes, cooled and washed with 200 parts of distilled water. Following the washing treatment, the reaction body was thoroughly stirred and refiltered. The second filtrate was then combined with the first filtrate, which was previously set aside, and the combined filtrates evaporated at a reduced pressure at a temperature of 50° C. until crystallization occurred. The crystals, which separated were filtered free from the liquor and were substantially pure potassium pyroantimoniate ($K_4Sb_2O_7$).

The crystalline material was further purified by washing with absolute alcohol until substantially free of alkali. The washed crystals were dried at about 97° C. and then a selected amount was added to a weighed amount of iron oxide such as ferro-ferric oxide, preferably an amount of the purified pyroantimoniate sufficient to give a catalyst composition of 5% potassium pyroantimoniate and 95% iron oxide, and the resultant mixture, after the addition of sufficient alcohol to permit mixing, was slurried to a thick, smooth paste. This paste was then dried at 107° C. to form a solid cake-like mass which was ground to pass a 30 mesh screen, redried and formed into pills. The pilled material was then heated in a free oxygen-containing atmosphere at 1000° F. for about 4½ hours and allowed to cool to obtain the finished catalyst.

*Example II*

The catalyst prepared in accordance with Example I was treated with a reducing gas including free hydrogen at a temperature of 700° F. and a hydrogen gas rate of about 1000 volumes per volume of catalyst per hour for 24 hours following which it was employed to synthesize hydrocarbons and oxygenated compounds from a feed mixture including one part of hydrogen and one part of carbon monoxide at a temperature between 550° and 575° F., a pressure of 150 pounds per square inch, and a feed rate of 200 volumes of feed gas mixture per volume of catalyst per hour. The run was conducted for an 816 hour period during which time substantial quantities of hydrocarbons, including oxygenated organic compounds, and water, also including oxygenated organic compounds, were produced; the data presented in the following table show the conditions employed in the run and the results of the inspections of the products. The data included in the following table present high and low figures over the run period given with respect to the operating conditions. The examination of the products represents the inspections of the product produced over the run period for which the conditions are given:

It will be apparent from the data in the foregoing table and the inspection characteristics of the products obtained that very good yields of hydrocarbons and water were produced throughout the operating period. The amount of hydrocarbons produced ranged from 158 cc. of $C_4$ and heavier hydrocarbons produced at the outset of the run to as high as 221 cc. of $C_4$ and heavier hydrocarbons per cubic meter of feed gas charged. Similarly, substantial yields of water containing appreciable quantities of oxygenated organic compounds were also produced.

The examination of the products showed that the hydrocarbons produced contained appreciable quantities of alcohols calculated as amyl alcohol, and quantities of carbonyls and organic acids, which contribute to the commercial utility of the process.

Although specific examples illustrating the practice of the present invention have been given, these examples are for illustrative purposes only and are not intended to limit the scope of the invention. It is to be understood that the present invention is directed to a method for obtaining hydrocarbons and oxygenated organic compounds involving contacting a mixture of CO and $H_2$ at suitable temperatures and pressures with a catalyst which before reduction comprises a major portion of iron oxide and a minor portion of an alkali metal pyroantimoniate as a promoter. It will be apparent to a worker skilled in the art that while specific examples of preferred temperature and pressure ranges for conducting the operation have been given, other conditions may at times be desirable and may be employed without departing from the scope of the invention.

The catalyst and the preferred method for producing the catalyst which is disclosed in the present application are claimed in my co-pending application Serial No. 717,584, filed December 20, 1946.

*Table*

| | | | | |
|---|---|---|---|---|
| Temperature | 550 | 550 | 550 | 575 |
| Pressure, p. s. i. g | 150 | 150 | 150 | 150 |
| Feed rate, v./v./hr | 200 | 200 | 200 | 200 |
| $H_2$/CO ratio (Cg) | 0.903–1.134 | 0.903–1.00 | 0.881–0.906 | 0.906–1.068 |
| Hours on stream | 0–120 | 120–240 | 240–336 | 226–456 |
| CO conversion, mol per cent | 95.5–97.0 | 83.6–95.0 | 81.7–86.3 | 92.0–94.0 |
| Output Yields, cc./M³ of $H_2$+CO cons.: | | | | |
| $C_4$+hydrocarbon | 158–214 | 153–192 | 203–212 | 170–264 |
| Water | 35–69 | 29–39 | 31–32 | 41–53 |
| Hydrocarbon test data:[1] | | | | |
| Specific gravity | 0.7709 | 0.7786 | 0.7694 | 0.7668 |
| Bromine number | 34.5 | 48.3 | 56.1 | 61.5 |
| Alpha olefin [2] | 34.9 | | | 52.9 |
| Beta olefin [2] | 20.7 | | | 30.6 |
| Alpha/beta olefin ratio | 1.686 | | | 1.37 |
| Alcohol, weight per cent $C_5H_{11}OH$ | 2.55 | | | 12.5 |
| Carbonyl, weight per cent $(C_2H_5)_2CO$ | 2.55 | 3.92 | 4.63 | 5.96 |
| Acid, weight per cent $C_4H_9COOH$ | 1.48 | 1.51 | 2.15 | 2.22 |
| Water test data: | | | | |
| Alcohol, weight per cent $C_2H_5OH$ | 13.0 | 16.0 | 17.6 | 13.4 |
| Carbonyl, weight per cent $(CH_3)_2CO$ | 1.61 | 1.28 | 2.01 | 2.94 |
| Acids, weight per cent $CH_3COOH$ | 0.18 | 0.24 | 0.24 | 0.21 |
| Temperature | 575 | 575 | 575 | |
| Pressure, p. s. i. g | 150 | 150 | 150 | |
| Feed rate, v./v./hr | 200 | 200 | 200 | |
| $H_2$/CO ratio (Cg) | 1.085 | | 0.86–1.18 | |
| Hours on stream | 456–576 | 576–696 | 696–816 | |
| CO conversion, mol per cent | 86.0 | | 58.7–89.4 | |
| Output yields, cc./M³ of $H_2$+CO cons.: | | | | |
| $C_4$+hydrocarbon | 189 | | 176–214 | |
| Water | 63 | | 33–60 | |
| Hydrocarbon test data:[1] | | | | |
| Specific gravity | 0.7800 | 0.7848 | 0.7800 | |
| Bromine number | 63.6 | 63.0 | 53.0 | |
| Alpha olefin [2] | | | | |
| Beta olefin [2] | | | | |
| Alpha/beta olefin ratio | | | | |
| Alcohol, weight per cent $C_5H_{11}OH$ | 6.33 | 5.57 | 4.05 | |
| Carbonyl, weight per cent $(C_2H_5)_2CO$ | 1.83 | 1.86 | 3.06 | |
| Acid, weight per cent $C_4H_9COOH$ | | | | |
| Water test data: | | | | |
| Alcohol, weight per cent $C_2H_5OH$ | 13.6 | 16.4 | 14.87 | |
| Carbonyl, weight per cent $(CH_3)_2CO$ | 1.86 | 1.63 | 0.78 | |
| Acids, weight per cent $CH_3COOH$ | 0.18 | 0.15 | 0.24 | |

[1] Based on recovered liquid product.
[2] Calculated as bromine number based on olefin type determination by infrared absorption, uncorrected for oxygenated compound interference.

The nature and objects of the present invention having been fully described and illustrated, what I wish to claim as new and useful and to secure by Letters Patent is:

1. A process for producing hydrocarbons and oxygenated organic compounds comprising the steps of contacting a gaseous mixture of carbon monoxide and hydrogen at a superatmospheric temperature and pressure with a catalyst comprising a reduced mixture of a major portion of iron oxide and a minor portion of an alkali metal pyroantimoniate to form a product comprising substantial amounts of hydrocarbons and oxygenated organic compounds.

2. A process in accordance with claim 1 in which the alkali metal is potassium.

3. A process for producing hydrocarbons and oxygenated organic compounds including the steps of passing a gaseous mixture of carbon monoxide and hydrogen over a catalyst comprising a reduced mixture of a major portion of iron oxide and a minor amount of an alkali metal pyroantimoniate under superatmospheric temperature and pressure to form a product comprising a substantial amount of hydrocarbons and oxygenated organic compounds.

4. A process in accordance with claim 3 in which the alkali metal is potassium.

5. A process in accordance with claim 3 in which the iron oxide is alpha iron oxide.

6. A process in accordance with claim 3 in which the iron oxide is gamma iron oxide.

7. A process in accordance with claim 3 in which the iron oxide is ferro-ferric oxide.

8. A process for producing hydrocarbons and oxygenated hydrocarbons including the steps of passing a gaseous mixture of carbon monoxide and hydrogen at a temperature within the range of 450° to 675° F. and a pressure in the range of 100 to 500 pounds per square inch gauge over a catalyst prepared by the reduction of a mixture comprising a major portion of iron oxide and a minor portion of an alkali metal pyroantimoniate to produce a substantial amount of hydrocarbons and oxygenated organic compounds, removing product from contact with the catalyst and recovering hydrocarbons and oxygenated organic compounds therefrom.

9. A process in accordance with claim 8 in which the catalyst comprises iron oxide in the range of 80 to 99.8% of the catalyst and the alkali metal pyroantimoniate in the range of 0.2 to 20% of the catalyst.

10. A process for producing hydrocarbons and oxygenated organic compounds including the steps of passing a gaseous mixture of carbon monoxide and hydrogen at a temperature within the range of 450° to 675° F. and a pressure in the range between 100 to 500 pounds per square inch gauge over a catalyst mass prepared by the reduction of a mixture comprising a major portion of ferro-ferric oxide and a minor portion of potassium pyroantimoniate to obtain a substantial amount of hydrocarbons and oxygenated organic compounds as products, removing products from contact with the catalyst, and recovering hydrocarbons and oxygenated organic compounds therefrom.

11. A process in accordance with claim 10 in which the ferro-ferric oxide comprises 95% of the catalyst and the potassium pyroantimoniate comprises 5% of the catalyst.

MAX A. MOSESMAN.

REFERENCES CITED

The following references are of record in the file of this patent:

UNITED STATES PATENTS

| Number | Name | Date |
| --- | --- | --- |
| 2,093,504 | Zirngible | Sept. 21, 1937 |

FOREIGN PATENTS

| Number | Country | Date |
| --- | --- | --- |
| 229,714 | Great Britain | Feb. 23, 1925 |
| 254,760 | Great Britain | July 2, 1926 |
| 254,819 | Great Britain | July 9, 1926 |